Feb. 4, 1930.  W. F. KOLETA  1,746,119
TIRE FABRIC CUTTING AND BAND BUILDING MACHINE
Filed Sept. 4, 1926  6 Sheets-Sheet 1
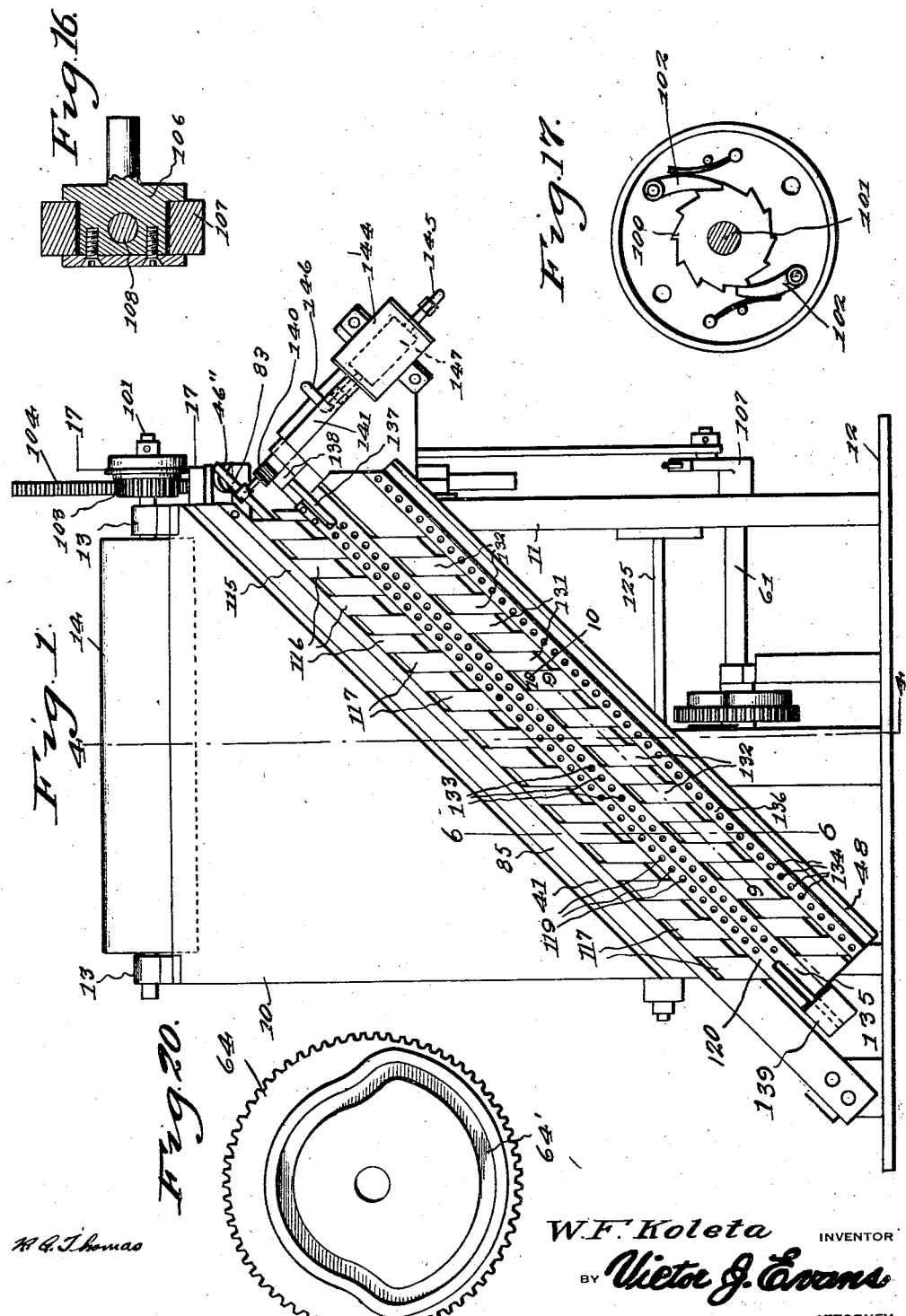

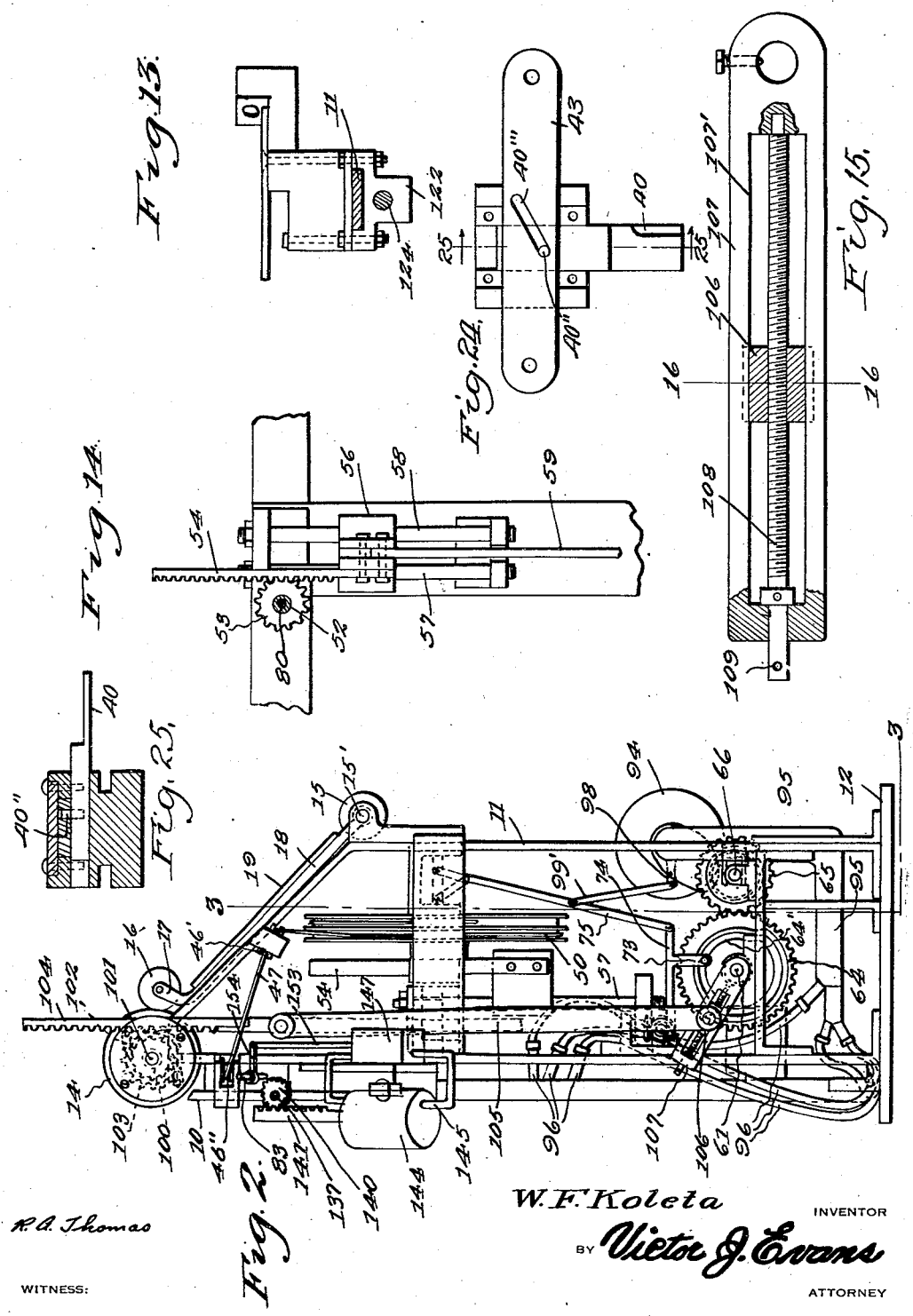

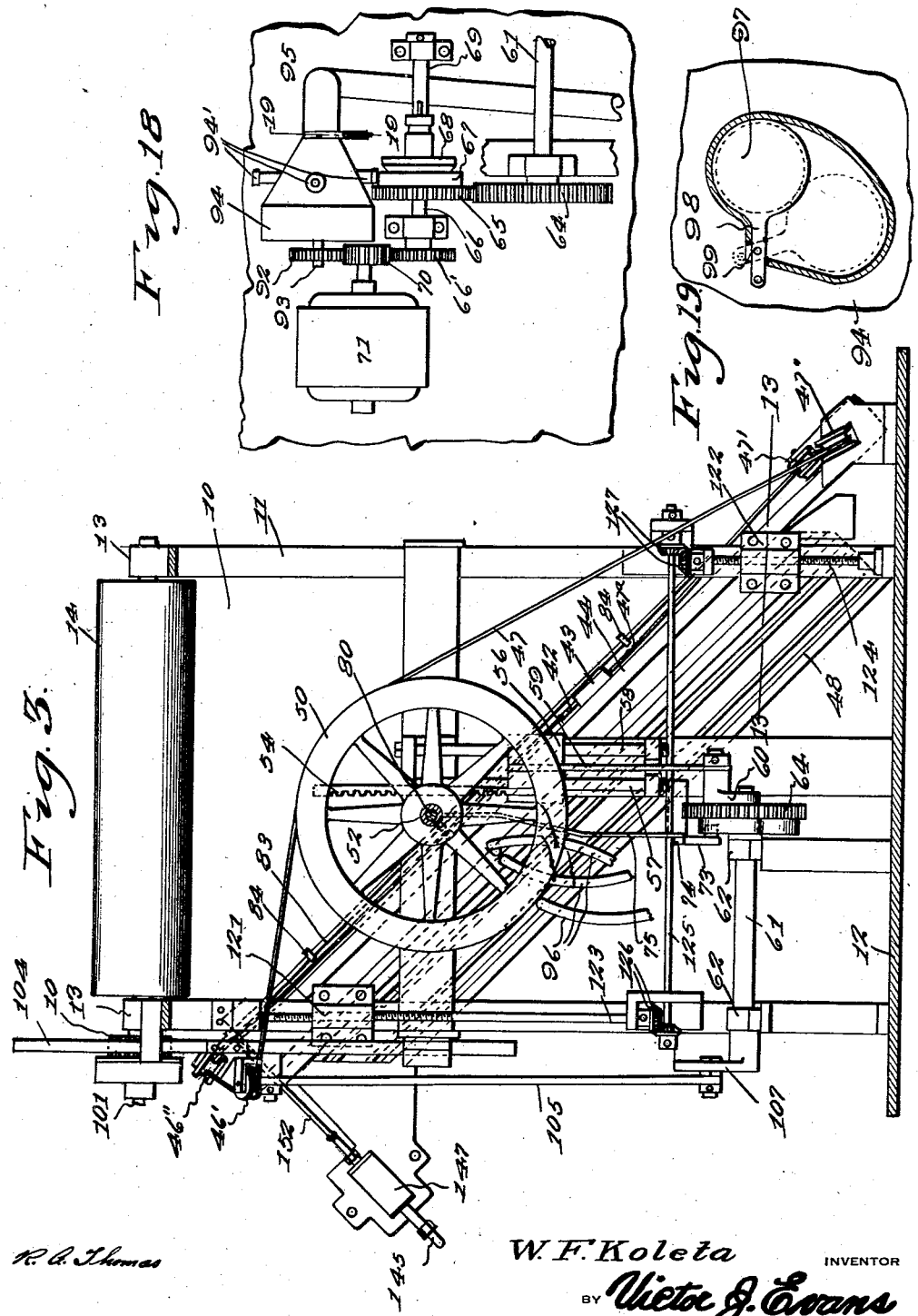

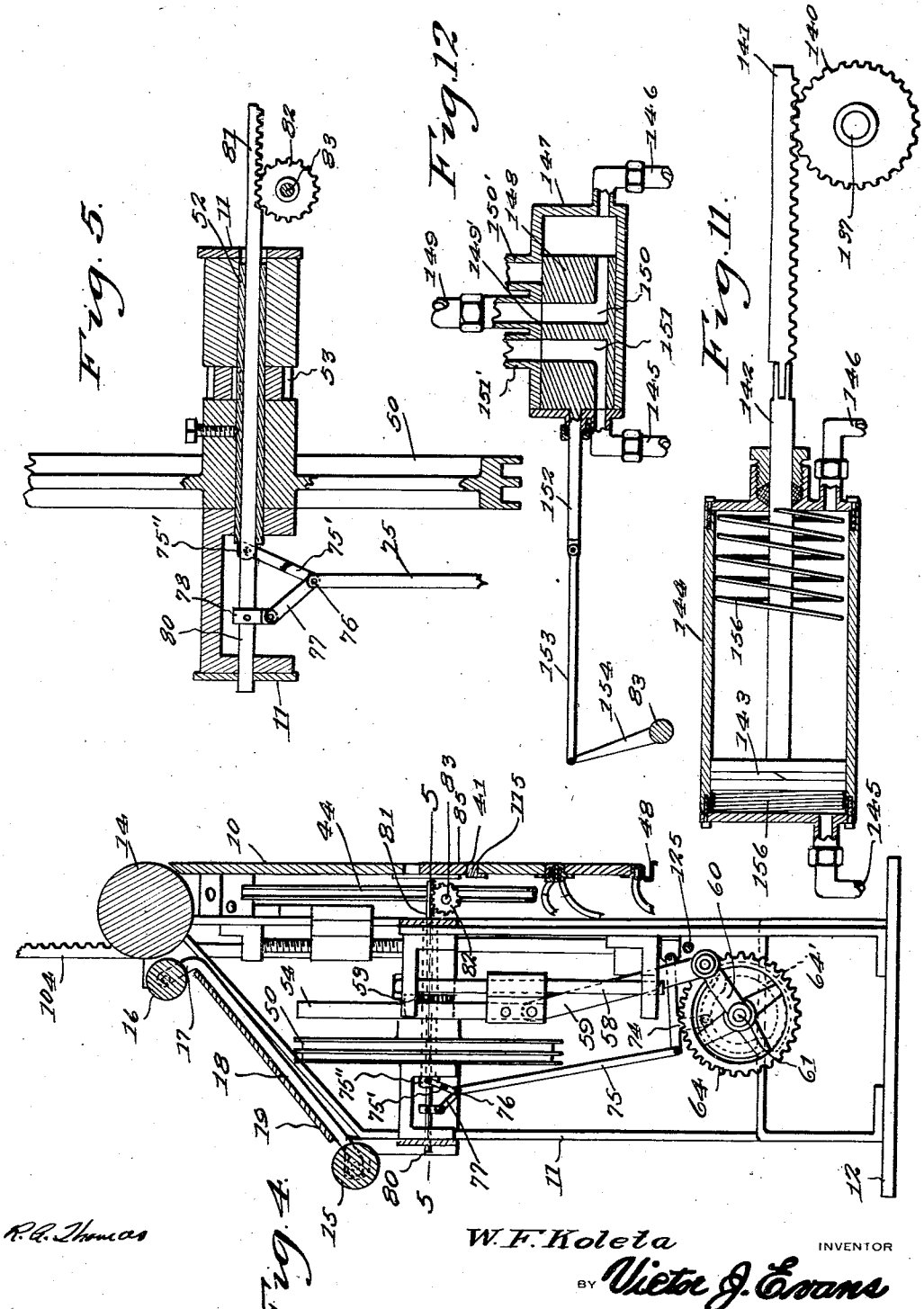

Feb. 4, 1930.  W. F. KOLETA  1,746,119
TIRE FABRIC CUTTING AND BAND BUILDING MACHINE
Filed Sept. 4, 1926  6 Sheets-Sheet 5
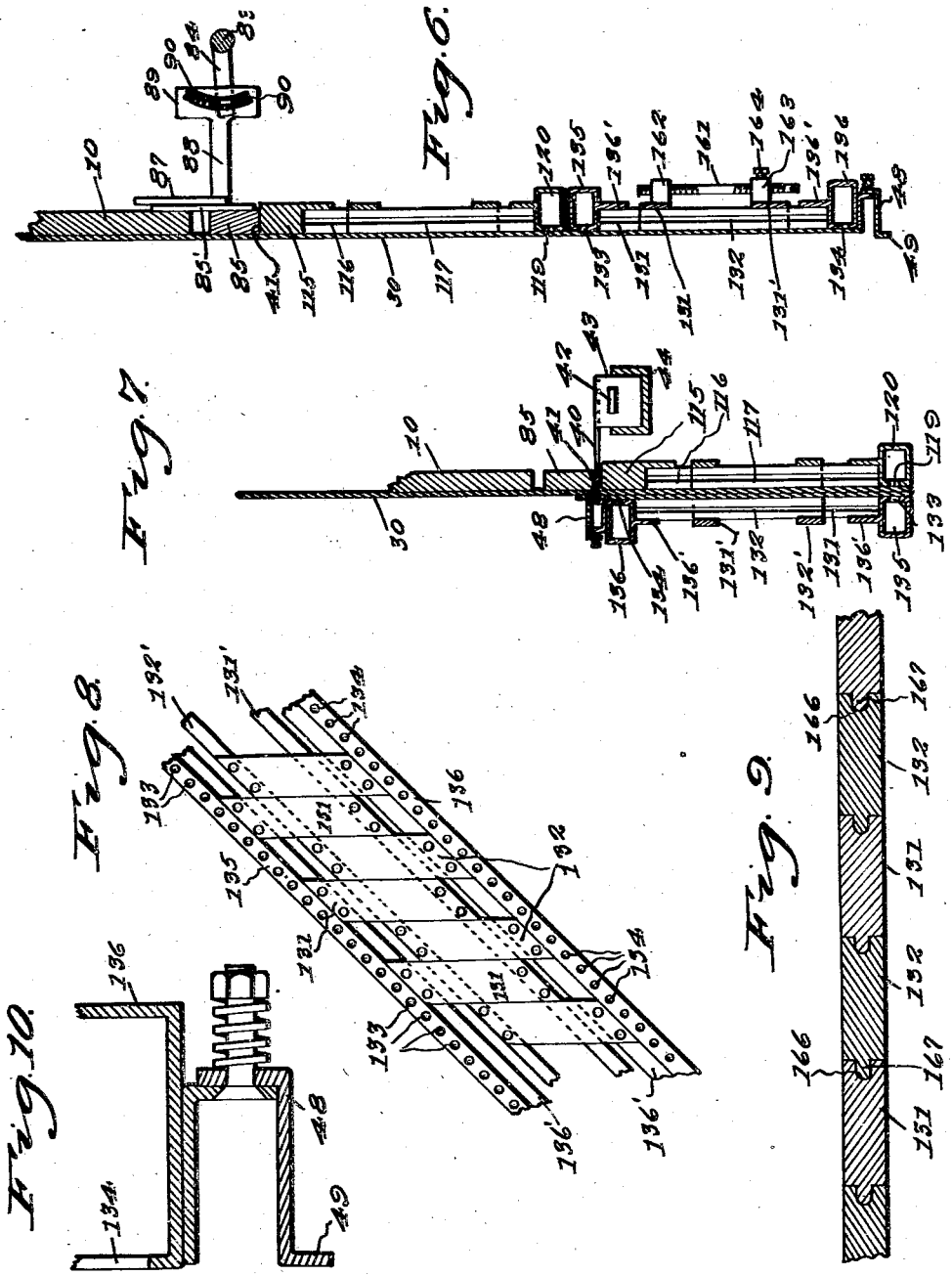

Feb. 4, 1930.  W. F. KOLETA  1,746,119
TIRE FABRIC CUTTING AND BAND BUILDING MACHINE
Filed Sept. 4, 1926  6 Sheets-Sheet 6
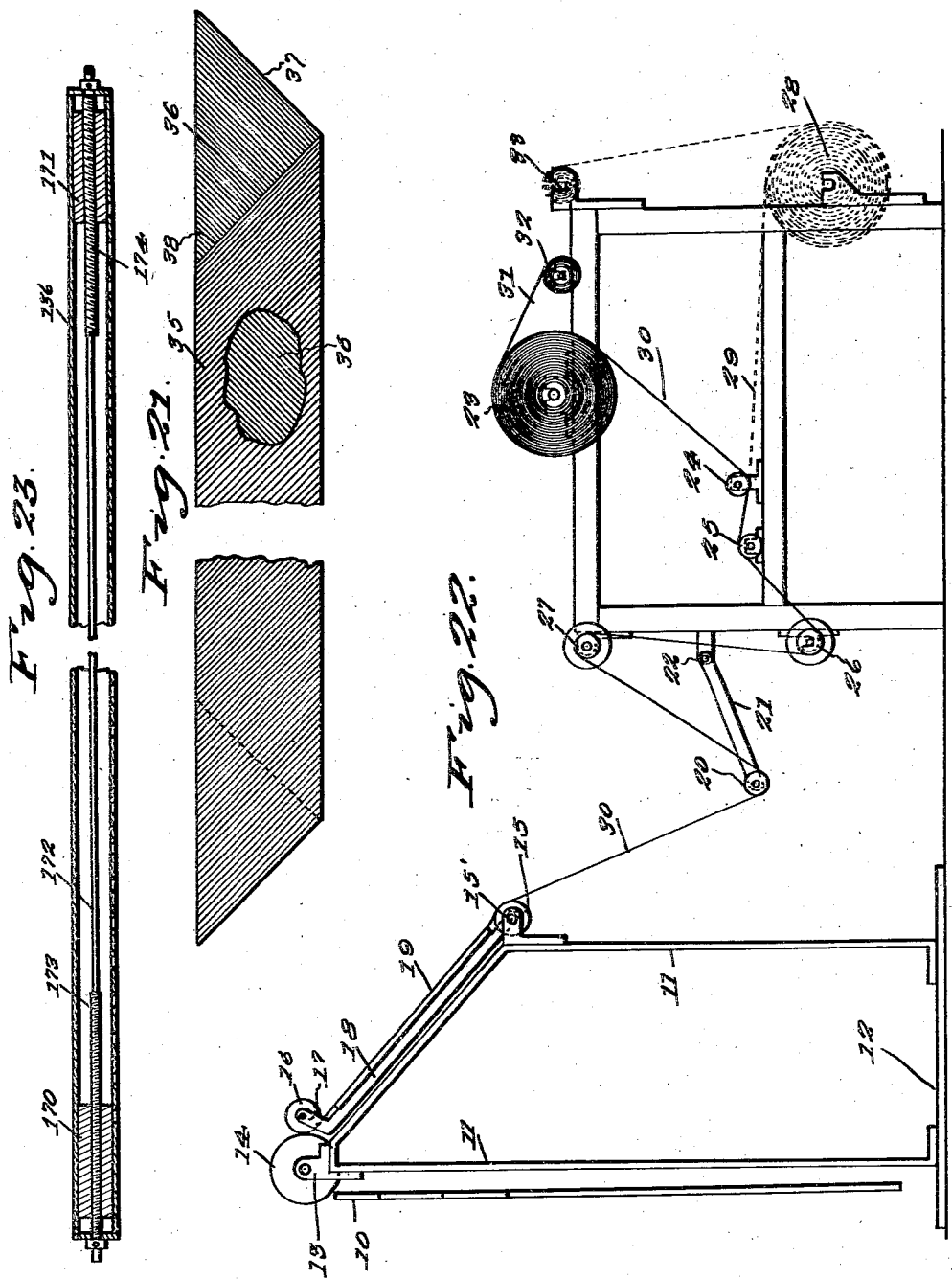
W. F. Koleta
INVENTOR Patented Feb. 4, 1930

1,746,119

UNITED STATES PATENT OFFICE

WILLIAM F. KOLETA, OF AKRON, OHIO

TIRE-FABRIC CUTTING AND BAND-BUILDING MACHINE

Application filed September 4, 1926. Serial No. 133,694.

The object of this invention is to provide a machine designed to fold strips cut on a bias from a sheet of cord tire fabric, and to produce this operation while the fabric is on the cutting table, the cords of the adjacent layers of the folded strip extending at an angle with each other, and the ends being in proper relation for bringing them together in producing the tire band.

A further object is to eliminate the manual folding of the strip and to produce quicker and more accurate results than are obtained by manual work.

A further object is to produce the folding operation by means pneumatically controlled.

A further operation is to effect proper timing between the feeding, cutting, and folding mechanism.

A further object is to provide for mechanically folding strips cut from sheets of different widths.

A further object is to provide means whereby the folding mechanism may successfully handle strips designed for use in making tires of different sizes or cross sections.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the machine in front elevation.

Figure 2 is a view in side elevation.

Figure 3 is a vertical section on line 3—3 of Figure 2.

Figure 4 is a vertical section on line 4—4 of Figure 1.

Figure 5 is a detail in section on line 5—5 of Figure 4.

Figure 6 is a vertical section on line 6—6 of Figure 1, this view being intended to show especially the relation of the elements of the folding devices; and also illustrating elements associated with the cutting mechanism.

Figure 7 is a vertical section showing the swinging member of the folding mechanism in its upper position.

Figure 8 is a fragmentary view in elevation, showing relatively adjustable portions of the folding mechanism.

Figure 9 is a section on line 9—9 of Figure 1, showing tongue and groove connection between the relatively slidable elements of Figure 8.

Figure 10 is a section on line 10—10 of Figure 1.

Figure 11 is a section thru the cylinder forming a part of the air pressure controlling means for the swinging element of the folding means, the axis of the pinion in this view representing the axis about which the folding device is movable.

Figure 12 is a section thru the valve mechanism controlling the air for the cylinder of Figure 11.

Figure 13 represents a detail of construction described below, in connection with the adjustment of the folding means, the view being on line 13—13 of Figure 3.

Figure 14 is an elevation of the rack and pinion mechanism forming a part of the knife operating construction.

Figure 15 is a detail view showing means for adjusting the rack of the stroke of certain of the operative elements.

Figure 16 is a section on line 16—16 of Figure 15.

Figure 17 is a section on line 17—17 of Figure 1.

Figure 18 is a view of the motor, fan housing, in which suction is produced for the folding means, this view also illustrating clutch mechanism permitting the drive for the cutting and folding means to be discontinued without interrupting the drive for the suction fan.

Figure 19 is a section on line 19—19 of Figure 18, showing a valve between the fan housing and the air duct connected therewith.

Figure 20 is a detail in elevation showing a cam forming an important element of the driving mechanism.

Figure 21 is a view with part broken away, showing the strip of cord tire fabric folded as it comes from the machine, the cords of adjacent layers being at an angle with each other, and the portion at the extreme right representing the projecting end of a single layer, to be connected with the projecting end at the opposite portion of the strip.

Figure 22 shows diagrammatically the feeding of the cord tire fabric, from one of the large rolls toward the right, to the machine on which this case is based, a second roll of fabric being in position for use when the roll on the top of the frame at the right has become exhausted.

Figure 23 is a longitudinal section showing means for cutting off some of the air ports in one of the ducts of the folding means, in order to provide for handling a sheet of less width.

Figures 24 and 25 are detail views showing the control of the knife block—Figure 25 being on line 25—25 of Figure 24.

The machine includes a table 10 carried in a vertical position by a main frame 11, the later being provided with a base 12. Mounted in bearings 13 at the top of the frame is an upper roller 14 over which the tire fabric passes to the cutting blade and the folding means.

The fabric as it is fed to the machine passes over roller 15, and thence under roller 16, and to said roller 14 before mentioned, the sheet being retained in proper position by the roller 16 mounted in the upstanding ends 17 of arms such as 18, these arms being adapted to swing slightly with reference to pivotal mounting at 15'. The sheet is guided by plate 19, and as the feeding of the sheet is important, it may be controlled by a gravity device including roller 20 mounted in arms 21 and pivoted at 22,—this gravity device being designed to operate thru means not shown for controlling the movement of the sheet from the large roll 23 mounted on the top of the machine. The fabric is fed from this roll under roll 24, over roll 25, and under roll 26, passing thence upwardly over roll 27, and then to roll 20, by which it is held taut.

Owing to the time required for handling large rolls of fabric, an additional roll 28 is placed in position while the roll 23 is being used. The fabric passes from roll 28, when in use, in the direction shown by the dotted line 29. The sheet wound between the thicknesses of the cord fabric 30, for the purpose of preventing adjacent layers from adhering, is designated 31, and this sheet 31 is wound off on rollers such as 32 or 33, being no longer required so far as the particular roll on which it was employed is concerned.

The fabric 30 is to be cut on a bias, or diagonally, as indicated by the relative position of roller 14 in Figure 1, and the folding devices. When cut and folded to the size required for the cross section of a given tire, the strip of cord fabric appears as in Figure 21, wherein the cords of one layer are approximately perpendicular to those of the other layer.

The strip includes the layer or thickness 35 and the layer or thickness 36, the latter extending as shown at 37 beyond the edge 38, as shown in Figure 21, and a similar end arrangement being shown at the left of Figure 21, or being assumed, so that when the ends of the strip are brought together to form the tire band, the ends will overlap and adhere,—it being understood that a commercial type of cord fabric, rubberized in the usual manner, is employed.

The sheet of fabric passes downwardly over table 10 to the knife 40, which cuts on the up stroke, the knife moving diagonally with reference to the table 10, and projecting thru slot 41. The knife is carried as in other machines for cutting tire fabric, by a block 43 slidable on inclined channel bar 44, and the knife is thrown outwardly to operative position when tension is produced by flexible element 47 at the point where it has connection with the upper end of the sliding means. The outward movement of the knife is the result of the pin and slot mounting of Figure 24. Knife 40 carries a pin 40" engaging slot 40'" in block 43, so that tension on element 47 determines the position of the knife according to the direction of the tension. A resiliently mounted device 48 (Figures 6, 7 and 10) on air duct 136 extends over the knife and knife slot, and is flanged at 49 for holding the fabric while being cut and preventing it from moving outwardly from the table.

The knife 40 recedes thru slot 41 when tension is produced in the opposite direction, that is on the lower end of bar 42 where it has connection with the end 47$^a$ of the flexible element 47. The flexible element 47 passes over guiding pulleys such as those shown at 46', 46", 47', 47". and the flexible element is trained around the large wheel 50 having grooves on the exterior thereof.

Wheel 50, around which flexible device 47 passes, making one complete turn, (the ends of flexible device being secured to the wheel)—is rigid on tubular shaft 52, as illustrated, being released by its set screw, which may enter a segmental groove in shaft 52, before beginning operation, and the shaft 52 carries a pinion or gear wheel, or other threaded element, 53 with which rack bar 54 meshes. The rack bar is operated or reciprocated, as described below, and imparts oscillating movement to wheel 50, whereby the knife controlled by flexible device 47, is caused to move diagonally across the table 10, and upwardly in the cutting operation, and is then reversed, the knife receding in the reverse movement, as previously indicated.

Rack bar 54 is connected with a block 56 slidable on bars 57 and 58, and the element 56 has pivotal connection by means of a pitman 59 with crank arm 60 on shaft 61, mounted horizontally in bearings such as 62.

Shaft 61 has keyed thereon a gear wheel 64 meshing with gear wheel 65 on shaft 66, and the latter carries or has formed thereon a clutch element 67 cooperating with clutch element 68 splined on shaft 69. Wheel 65 is loose on shaft 66 until engaged by the clutch element 68, shaft 66 being driven thru gearing including gear wheel 66' and gear wheel or pinion 70 on the shaft of motor 71.

The drive on gear wheel 64 and wheel 50 may therefore be controlled by throwing out clutch element 68, or throwing it into engagement with clutch element 67 when the knife is to be operated.

Gear wheel 64 on shaft 61 may have a cam slot 64' therein, and this slot is engaged by a roller on the end of arm 73 on pivoted arm 74 which has pivotal connection with bar 75. This element 75 is pivoted at 76 to link 77, and the latter is pivoted to ears formed on collar 78.

When bar 75 is lifted, by the operation of the cam mechanism, and the connection therewith by arm 74,—thrust is imparted thru link 77 to shaft 80, which is slidable in hollow shaft 52, said shaft 80 carrying or having formed therewith a rack portion 81 meshing with gear wheel 82. The longitudinal movement of shaft 80 depends in part upon the function of member 75' extending between point 76 and a point of pivotal mounting at 75''.

Wheel 82 is mounted on shaft 83 of Figures 5 and 6, and this shaft carries an arm or arms 84 acting to close the cover plate 85 for knife slot 41. This plate is guided by an arm 85' at each end, along a stationary plate 87, and connected with plate 85 are arms 88 mounted on elements 89 to which movement is imparted by arms 84 when shaft 83 is rocked. Opposed springs 90 engage an element on arm 84, and permit of further rotation of shaft 83 after the cover plate 85 has reached its limit of movement. The cover plate for the knife slot renders impossible any accidental cutting of the fabric.

The motor 71 and the pinion 70 on its armature shaft, drives gear wheel 92 on the shaft 93 of a suction fan, not shown, but mounted in housing 94, the latter having connection with duct 95, by means of which suction, or reduced air pressure is produced for the folding devices including the apertured ducts of Figures 6 and 7, the outer portions of which appear in Figure 1. The connections for these ducts of Figures 6 and 7 are thru tubular members 96 of Figure 2 and elsewhere.

A gate valve 97, shown in detail in Figure 19, includes an arm 98 pivoted at 99, and the valve is adapted to discontinue the suction on the folding devices, or rather on the sheet of material being cut and folded, it being obvious that the suction is only required periodically.

Valve 97 is controlled by arm 99' of Figure 2, pivoted to bar 75, and also pivoted to arm 98 of valve 97.

The feed for roller 14 is thru ratchet mechanism including ratchet wheel 100 on shaft 101, and feeding pawls 102. Gear wheel 103 on shaft 101 is oscillated by ratchet bar 104, and the ratchet mechanism rotates the roller 14 during each movement of rack bar 104, in one direction. This bar 104 is operatively connected with bar 105 pivotally connected with block 106 of Figure 15, this block being adjustable with reference to crank arm 107 mounted on shaft 61. A screw 108 passes thru block 106, the later being slidable in guides formed in the edge portion 107', and said screw 108 is rotatable by means of any suitable tool inserted thru aperture 109. This arrangement permits of varying the stroke of rack bar 54 and the feed thru the ratchet mechanism in the upper part of Figure 2, which mechanism controls roller 14.

A stationary bar 115 extends in an inclined direction across table 10 and carries spaced downwardly extending tongues 116 which alternate with tongues 117 on duct 120 having ports 119 therein. These ports are in communication with exhaust duct 95, and the elements 117, and 120 are movable relative to bar 115 and tongues 116, in order to provide adjustment, and permit a portion of the fabric to be folded to the size required for a tire of a given cross section.

This adjustment of the structure comprising tongues 117, and duct 120 is effected by means of vertically slidable devices 121, 122, the position of which is controlled by vertical rods 123, 124 threaded thru devices 121, 122 and rotated for purposes of adjustment by transverse shaft 125 and gearing shown at 126, 127.

Shaft 125 may be engaged at the end or ends thereof by any suitable means producing rotation thereof when making the adjustment indicated.

The swinging element of the folding means includes duct 135 and means thereon mounting tongues 131 alternating with tongues 132 extending from duct 136. Ports 133, 134 are provided in exhaust ducts 135, 136 in order that the suction may hold the tire fabric in position. These ducts, and duct 120, are connected by tubes 96 of Figure 2 and elsewhere with the exhaust duct 95 in which reduced air pressure is maintained by the suction fan in housing 94. It should be added that the latter is provided with relief valves 94' preventing the collapse of the housing when valve 97 is closed.

The swinging structure of the fabric folding mechanism carries axial element 137 at its upper end, this element being mounted in bearing 138, and the lower portion of the swinging structure being suitably mounted at 139. Gear wheel 140 on axial element 137 is rotated by rack bar 141 formed on or connected with piston rod 142 carrying piston 143 of Figure 11, and this piston operates in air cylinder 144 receiving air under pressure thru pipes 145, 146 of Figures 11 and 12.

Pipes 145, 146 are connected with opposite ends of valve casing 147 and valve 148 controls the passage of air under pressure from any suitable source of supply, thru pipe 149 leading to casing 147, the air passing thru port 150 of valve 148, and thru pipe 146 to air cylinder 144,—or passing thru valve port 151 and thru pipe 145 to the opposite end of cylinder 144, and on the other side of the piston therein.

It will be understood that port 150 or port 151 registers with the intake port 149', depending upon the position of valve 148 which is controlled by valve stem 152 and rod 153 connected with crank arm 154 on shaft 83, this being the shaft already referred to in connection with the description of the structure of Figure 5, and the shaft being operatively connected with the bar 75 of Figure 2. A spring 156 in cylinder 144 is engaged by piston 143, and provides a cushioning element. When slide valve 148 is in the position of Figure 12, air is being exhausted from the left end of cylinder 144, the port 151 being in communication with exhaust port 151' of the valve casing. The exhaust port 150' serves a similar purpose in connection with port 150 of the slide valve, when the valve has moved to the right from the position illustrated in Figure 12. In this manner provision is made for the movement of the swinging structure of the fabric folding mechanism.

In order to adjust the outer section of the swinging fabric folding device, including tongues 132 and duct 136, with reference to tongues 131, I provide screws 161, of Figure 6, these screws being rotatable by means of a suitable tool, and the screws passing thru threaded devices 162, 163, a set screw 164 maintaining the adjustment when obtained.

This adjustment last referred to, and the adjustment of the elements of the complementary stationary structure of the folding mechanism, permits the folding of strips of tire fabric of different size, for tires of different size or cross section.

Ducts 135, 136 carrying longitudinal flanges 136', and the relatively slidable tongues extend from the flanges, these tongues cooperating like matched boards, as indicated in Figure 9, where the longitudinal grooves 166 receive the edge tongues 167 formed on the tongues extending perpendicularly from the air ducts. Tongues 131 are connected by bar 131', and tongues 132 are connected by bar 132'.

When it is desired to employ a sheet of narrow fabric of less width than the maximum size or width provided for by the machine,—the outer or end ports in the air ducts of the folding mechanism are to be cut off, and this operation is produced by the construction of Figure 23, showing one of the air ducts 136 having blocks 170 and 171 slidable therein, these blocks being movable longitudinally of the duct 136 by means of a rod 172 threaded at 173 and 174, the threaded portions engaging bores in elements 170 and 171. The threads are right and left hand threads, and the rod 174 is rotatable by means of a tool which may be caused to engage either end of the rod, for producing rotation thereof. As many of the ports in the duct 136, or in the other ducts, as required, may be closed in order that proper suction may be maintained thru the remaining ports.

The cord tire fabric is fed by roller 14, thru the operation of the adjustable feeding mechanism including rack bar 104, and passes downwardly over table 10, and to the lower edge of the swinging element of the folding mechanism, the fabric being held by exterior air pressure, because of the reduced air pressure in ducts 120, 135 and 136.

The swinging element of the folding device is caused to move to the position of Figure 7, by the operation of the piston 143 in air cylinder 144, acting under air pressure, and the knife moves diagonally across the table, and severs a strip from the sheet, the cords of the strip extending diagonally thereof. The suction thru air ducts 120, 135 and 136, is relieved by the operation of valve 97, and the severed and folded strip is released from the table, the ends thereof projecting as in Figure 21, and these ends are manually brought together to form a tire band.

The machine will cut a single ply strip, as well as a strip of a width permitting folding. In order that the length may be exactly suited to a tire of the size to be manufactured, the diagonal cut is made in accordance with the width of the fabric. The latter is manufactured in widths varying from 56 inches to 59½ inches. If a strip 78.96 inches in length is required, a sheet 56 inches wide is employed, but if a strip of 83.19 is required for a tire of a given size, a sheet 59 inches in width is employed. These figures are given by way of example, and by taking advantage of exact measurements, the extra time required for manually cutting the separate strips to the desired length is avoided.

Having described the invention what is claimed is:—

1. In a machine of the class described, a table, a knife, means for moving the knife across the table, for severing a strip from a sheet of fabric, a strip folding means adjacent to the path of movement of the knife, and pneumatic means for operating the folding means, the folding means including elements relatively adjustable independently of the operation of the pneumatic means.

2. In a machine of the class described, a table, an air duct extending across the table, means producing reduced pressure in the duct, and means for folding a sheet of fabric passing over the table and while held temporarily by suction within the duct.

3. In a machine of the class described, a table, an air duct extending across the table, means producing reduced pressure in the duct, and means including an element carrying reduced air pressure for folding a sheet of fabric passing over the table and while held temporarily by suction within the duct.

4. In a machine of the class described, a table, an air duct extending across the table, means producing reduced pressure in the duct, and air controlled means for folding a sheet of fabric passing over the table and while held temporarily by suction within the duct.

5. In a machine of the class described, a table, an air duct extending across the table, means producing reduced pressure in the duct, and means for folding a sheet of fabric passing over the table, said folding means comprising relatively adjustable devices.

6. In a machine of the class described, a table, an air duct extending across the table, means producing reduced pressure in the duct, and means for folding a sheet of fabric passing over the table, said folding means comprising inter-engaging relatively adjustable devices.

7. In a machine of the class described, a table, an air duct extending across the table, means producing reduced pressure in the duct, and means for folding a sheet of fabric passing over the table, said folding means comprising relatively adjustable devices, and air ducts carrying said adjustable devices.

8. In a machine of the class described, a table, a knife, means for moving the knife across the table for severing a strip from a sheet of fabric passing over the table, said table being slotted to permit of the movement of the knife, means for closing the slot, and strip folding means mounted adjacent to the path of movement of the knife.

9. In a machine of the class described, a table, having a slot therein, a knife, means for moving the knife thru the slotted portion of the table, a folding device mounted adjacent to the slot, means for operating the folding device, and a device controlled by the means operating the folding device for closing the slot.

10. In a machine of the class described, a table, having a slot therein, a knife, means for moving the knife thru the slotted portion of the table, a folding device mounted adjacent to the slot, air controlled means for operating the folding device, and a device controlled by the means operating the folding device for closing the slot.

11. In a machine of the class described, means for cutting a strip of fabric from a sheet, said sheet having cords extending longitudinally thereof, and air controlled means for mechanically folding the strip along a line extending at an acute angle with reference to the series of cords, the cords of adjacent layers of the folded strips extending at an angle with reference to each other.

In testimony whereof I affix my signature.

WILLIAM F. KOLETA.